United States Patent
Furudate et al.

(10) Patent No.: US 6,748,551 B2
(45) Date of Patent: Jun. 8, 2004

(54) COMMUNICATION CONTROL SYSTEM

(75) Inventors: Naoki Furudate, Kawasaki (JP); Hideyuki Motoyama, Kawasaki (JP); Shinichi Sakamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 482 days.

(21) Appl. No.: 09/881,948

(22) Filed: Jun. 15, 2001

(65) Prior Publication Data

US 2002/0091970 A1 Jul. 11, 2002

(30) Foreign Application Priority Data

Jan. 11, 2001 (JP) ........................................ 2001-003985

(51) Int. Cl.[7] ............................................... G06F 11/30
(52) U.S. Cl. ........................................... 714/4; 714/13
(58) Field of Search ................... 714/4, 13, 43; 709/224

(56) References Cited

U.S. PATENT DOCUMENTS

| | | | |
|---|---|---|---|
| 5,483,519 A | * | 1/1996 | Satomi et al. ............... 370/228 |
| 6,002,665 A | * | 12/1999 | Choe ........................ 370/217 |
| 2001/0038606 A1 | | 11/2001 | Furudate et al. |

FOREIGN PATENT DOCUMENTS

| | | |
|---|---|---|
| JP | 2001-251389 | 9/2001 |
| JP | 2001-274864 | 10/2001 |

OTHER PUBLICATIONS

U.S. patent application Ser. No. 09/723,581, Maruyama, et al., filed on Nov. 28, 2000.

* cited by examiner

Primary Examiner—Scott Baderman
(74) Attorney, Agent, or Firm—Katten Muchin Zavis Rosenman

(57) ABSTRACT

A communication control system equipped with an efficient and economical rescue architecture is provided. A rescue bus is connected to units in a multiple formation and is used for rescue from a fault. A line switch connects a signal in a channel on a line and a signal processing part that processes the signal in normal operation, and disconnects the signal from the signal processing part when a fault has occurred. A rescue bus connecting switch connects the line and the rescue bus when the fault has occurred. A rescue switch connects the rescue bus and a backup signal processing part that processes the signal instead of a faulty unit. A communication units includes a switch part made up of the above switches and the signal processing part. A rescue unit includes a switch part made up of the above switches and the backup signal processing part, and performs a complete rescue or a provisional rescue. A monitor control device monitors fault occurrence and controls the switch part.

16 Claims, 13 Drawing Sheets

COMMUNICATION CONTROL SYSTEM

BACKGROUND OF THE INVENTION

1. Field of the Invention

The present invention relates to a communication control system, and more particularly to a communication control system having architecture for rescuing the system from a fault.

2. Description of the Related Art

Recently, a variety of services has been provided through a communication network using two-wire or four-wire metallic cables. Examples of the above services are POTS (Plain Old Telephone Service) that provides only the conventional voice communication service, and high-speed digital transmission service such as ISDN or xDSL (Digital Subscriber Line) service. Nowadays, there is a demand for a variety of different services that enable subscribers to have different operation styles and different transmission formations.

With regard to the above demand, a necessity of a subscriber termination unit in which different types of communication packages that match different transmission formations comes out from economical efficiency on the office side.

If it is considered that the above-mentioned subscriber termination unit having different types of communication packages is rescued from a fault that may occur in any of these packages, each of the communication packages will be doubled so as to form a redundant system for each of the different transmission formations (or each of the subscribers). However, the redundant system would decrease the number of lines that can be accommodated by the subscriber termination unit.

A redundant package for rescue may be provided for each of the different transmission formations. In this case, an N:1 redundant system including N communication packages and a single rescue package is configured. Wiring lines would be fixedly laid on a backboard of a housing of the subscriber termination unit. However, this would prevent the system from being rescued efficiently.

The following is assumed in order to describe the above redundant system in more detail. The subscriber termination unit is equipped with three types of communication packages that match transmission formation A, transmission formation B and transmission formation C, respectively. Wires are laid on the backboard of the housing of the subscriber termination unit in such a way as to assign a single rescue package to each of the three transmission formations. Thus, the N:1 redundant system is formed for each of the three transmission formations.

In the case thus assumed, if one of the communication packages involved in the transmission formation A fails to operate properly, the subscriber termination unit can be rescued by using the rescue package for the transmission formation A. However, if another communication package of the transmission formation A fails to operate properly, the system will be no longer rescued because no rescue package for the transmission formation A is available. The rescue packages of the transmission formations B and C cannot be used for rescue, because these rescue packages are fixedly connected to the communication packages of the transmission formations B and C.

As described above, the conventional arrangement of the rescue packages is not adaptive to the situation in which a fault occurs, and therefore the subscriber termination unit cannot be efficiently rescued.

SUMMARY OF THE INVENTION

Taking the above into consideration, an object of the present invention is to provide a communication control system capable of rescuing a unit equipped with communication packages of different transmission systems efficiently and economically if a fault has occurred in any of these communication packages.

To accomplish the above object, according to the present invention, there is provided a communication control system having a rescue architecture comprising: a rescue bus connected to units in a multiple formation; switch parts each including a line switch, a rescue bus connection switch and a rescue switch, the line switch connecting a signal in a channel on a line and a signal processing part that processes the signal in normal operation and disconnecting the signal from the signal processing part when a fault has occurred, the rescue bus connecting switch connecting the line and the rescue bus when the fault has occurred, the rescue switch connecting the rescue bus and a backup signal processing part that processes the signal instead of a faulty unit that is one of the units in which the fault has occurred; at least one communication unit including one of the switch parts and the signal processing part; a rescue unit including another one of the switch parts and the backup signal processing part and performing at least one of a complete rescue based on a unit basis and a provisional rescue based on a channel basis; and a monitor control device monitoring occurrence of a fault and perform switch control of the switch parts.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

A description will be given of preferred embodiments of the present invention with reference to the accompanying drawings.

Figure 1:
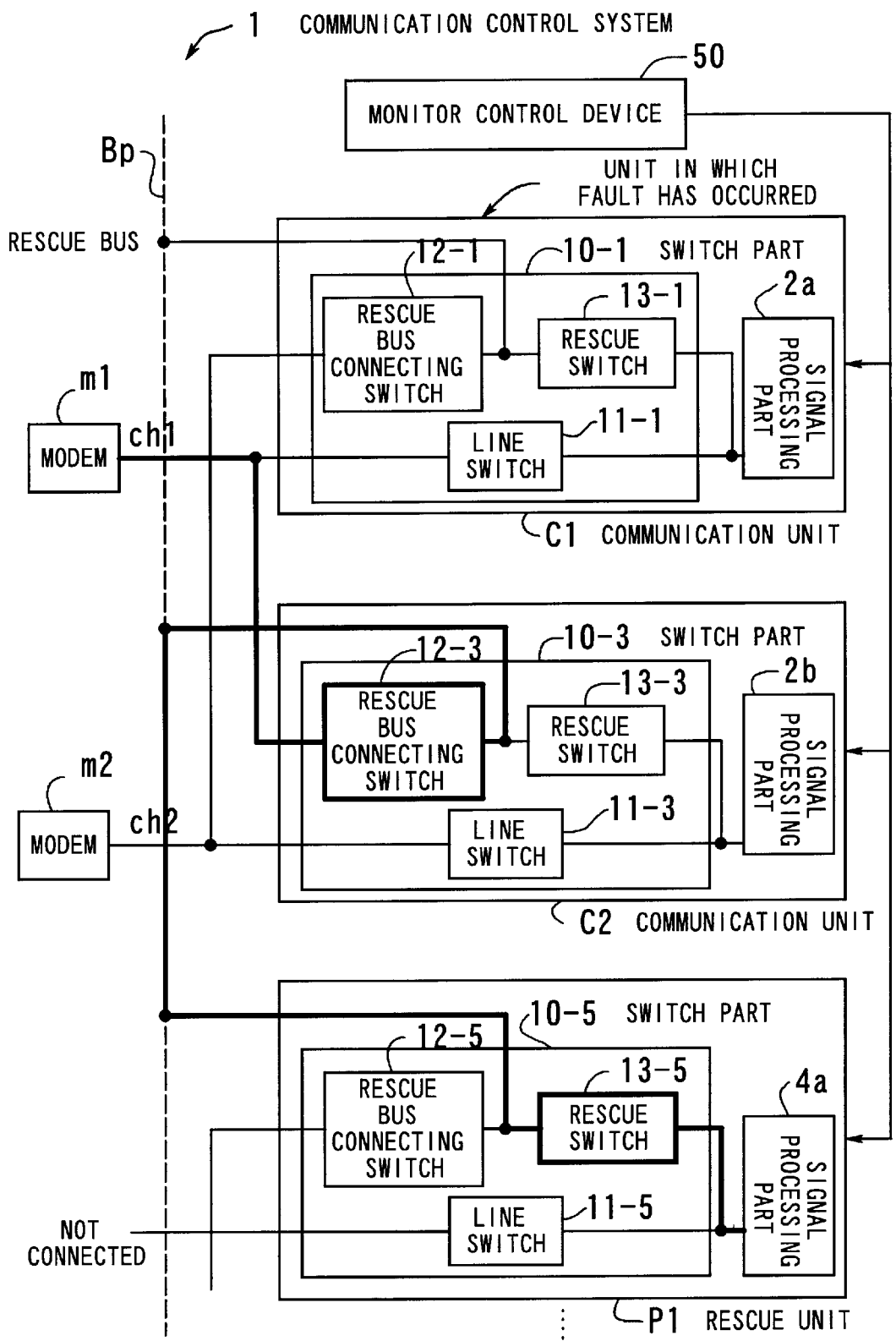
FIG. 1 is a block diagram illustrating the principles of a communication control system of the present invention.

FIG. 1 illustrates the principles of a communication control system of the present invention. A communication control system 1 shown in FIG. 1 has a rescue architecture and includes a rescue bus Bp, communication units C1 and C2, a rescue unit P1, and a monitor control device 50. The communication units C1 and C2 respectively include switch parts 10-1 and 10-3, and signal processing parts 2a and 2b. The signal processing parts 2a and 2b process signals of channels ch1 and ch2 on lines to which modems m1 and m2 are connected, respectively.

The rescue unit P1 is made up of a switch part 10-5 and a backup signal processing part 4a, and performs a complete rescue on the unit basis and a provisional rescue on the channel basis. The complete rescue and provisional rescue will be described later. The backup signal processing part 4a performs signal processing instead of the signal processing part that has failed to operate properly due to a fault. In the configuration shown in FIG. 2, the backup signal processing part 4a is used as a backup of the signal processing unit 2a.

The switch parts 10-1, 10-3 and 10-5 (generically called switch parts 10) are respectively made up of line switches 11-1, 11-3 and 11-5 (generically called line switches 11), rescue bus connection switches 12-1, 12-3 and 12-5 (generically called rescue bus connection switches 12), and rescue switches 13-1, 13-3 and 13-5 (generically called rescue switches 13).

The line switches 11 connect signals of the channels ch on the respective lines to the signal processing parts and the backup signal processing part in normal operation, and release the respective connections when a fault occurs. The rescue bus connection switches 12 connect the rescue bus Bp to a line related to a channel on which a fault occurs. The rescue switch 13-5 connects the backup signal processing part 4a to the rescue bus Bp when a fault occurs.

The monitor control device 50 monitors fault occurrence and totally controls the units C1, C2 and P1. For example, the switch parts 10-1 through 10-5 are controlled by the monitor control device 50.

The communication control system 1 thus configured operates as follows. In normal operation, the rescue bus connection switches 12 and the rescue switches 13 are OFF, while the line switches 11 are ON. It is assumed that a fault occurs in the communication unit C1 (more specifically, the signal processing part 2a fails to operate properly). The monitor control device 50 recognizes the occurrence of the fault, and instructs the switch parts 10 to perform the following switch control.

The line switch 11-1 is turned OFF so that the signal processing part 2a is disconnected from the modem m1. The rescue bus connection switch 12-3 is turned ON so that channel ch1 is connected to the rescue bus Bp. Further, the rescue switch 13-5 is turned ON so that the backup signal processing part 4a is connected to the rescue bus Bp.

The above-mentioned switch control disconnects the modem m1 from the faulty unit, and instead connects the modem m1 to the backup signal processing part 4a in the rescue unit P1 via the rescue bus Bp. Thus, the fault that has occurred in the communication unit C1 can be recovered by the rescue unit P1.

Next, a description will be given, by way of example, of a case where the communication control system 1 of the present invention is applied to a subscriber termination unit that accommodates subscribers and includes different types of communication packages that match different transmission formations (hereinafter, referred to as transmission systems).

Figure 2:
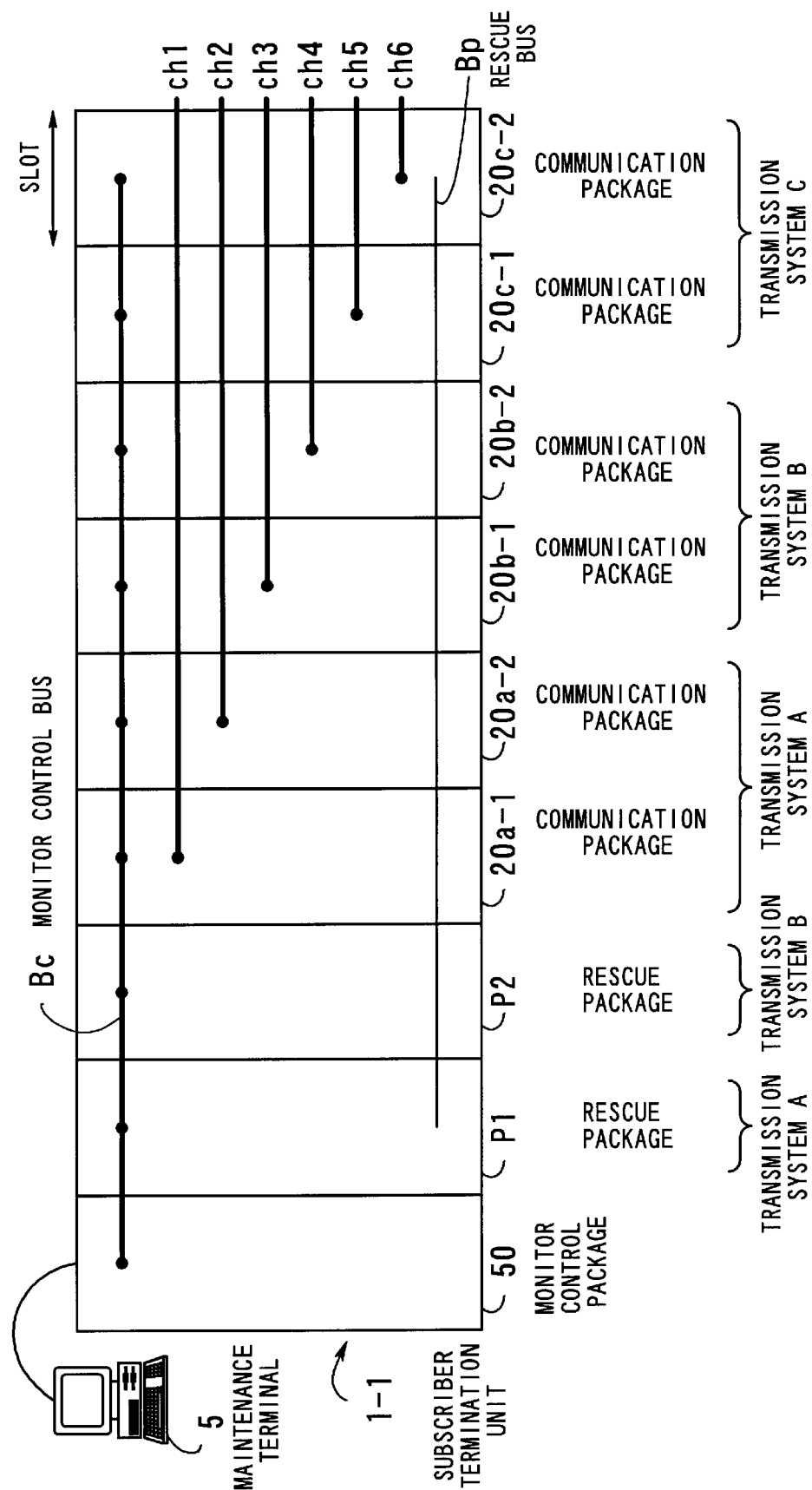
FIG. 2 is a diagram of a subscriber termination unit in which a fault is recovered by a shared rescue bus.
Figure 3:
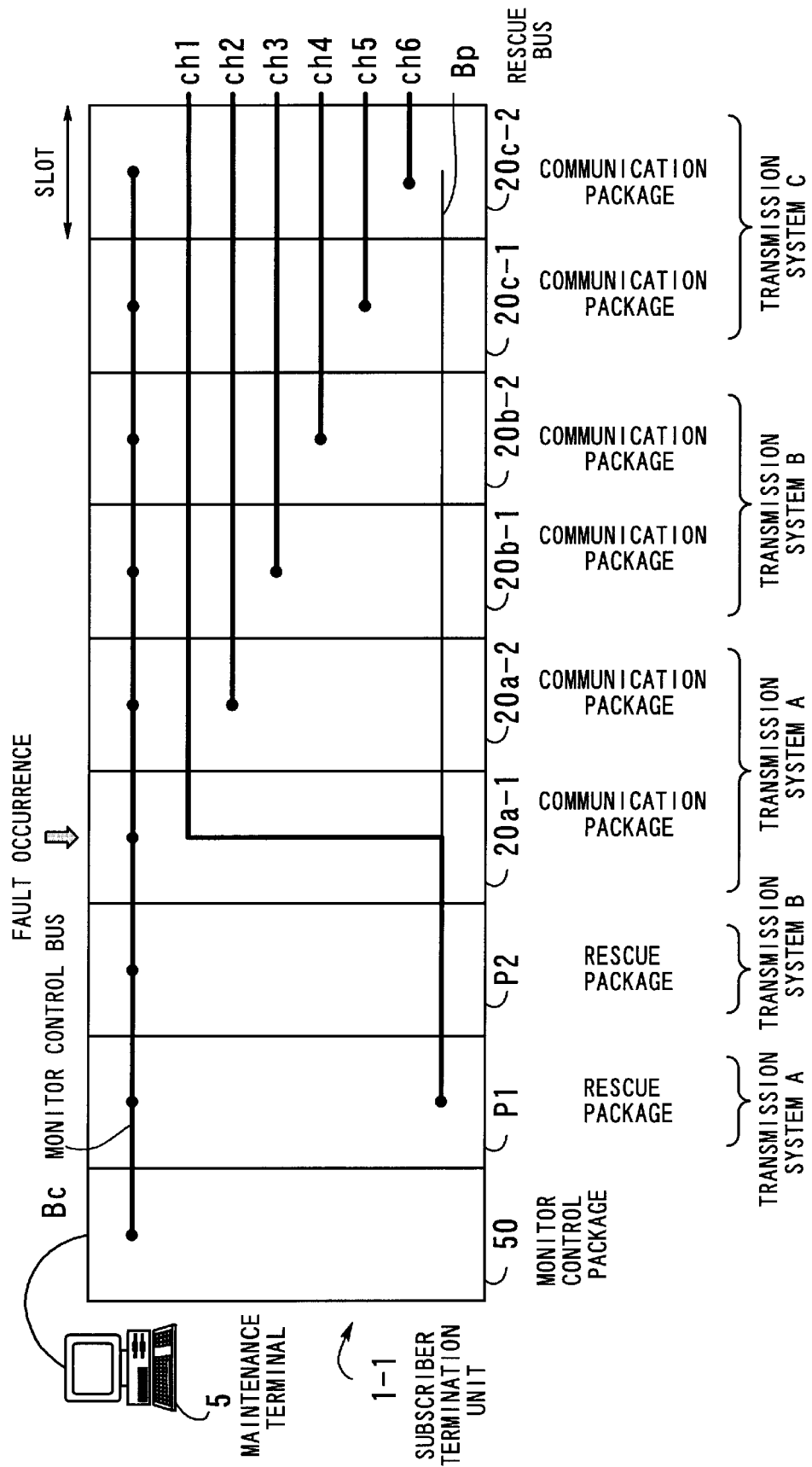
FIG. 3 is a diagram illustrating an operation of the subscriber termination unit shown in FIG. 2.
Figure 4:
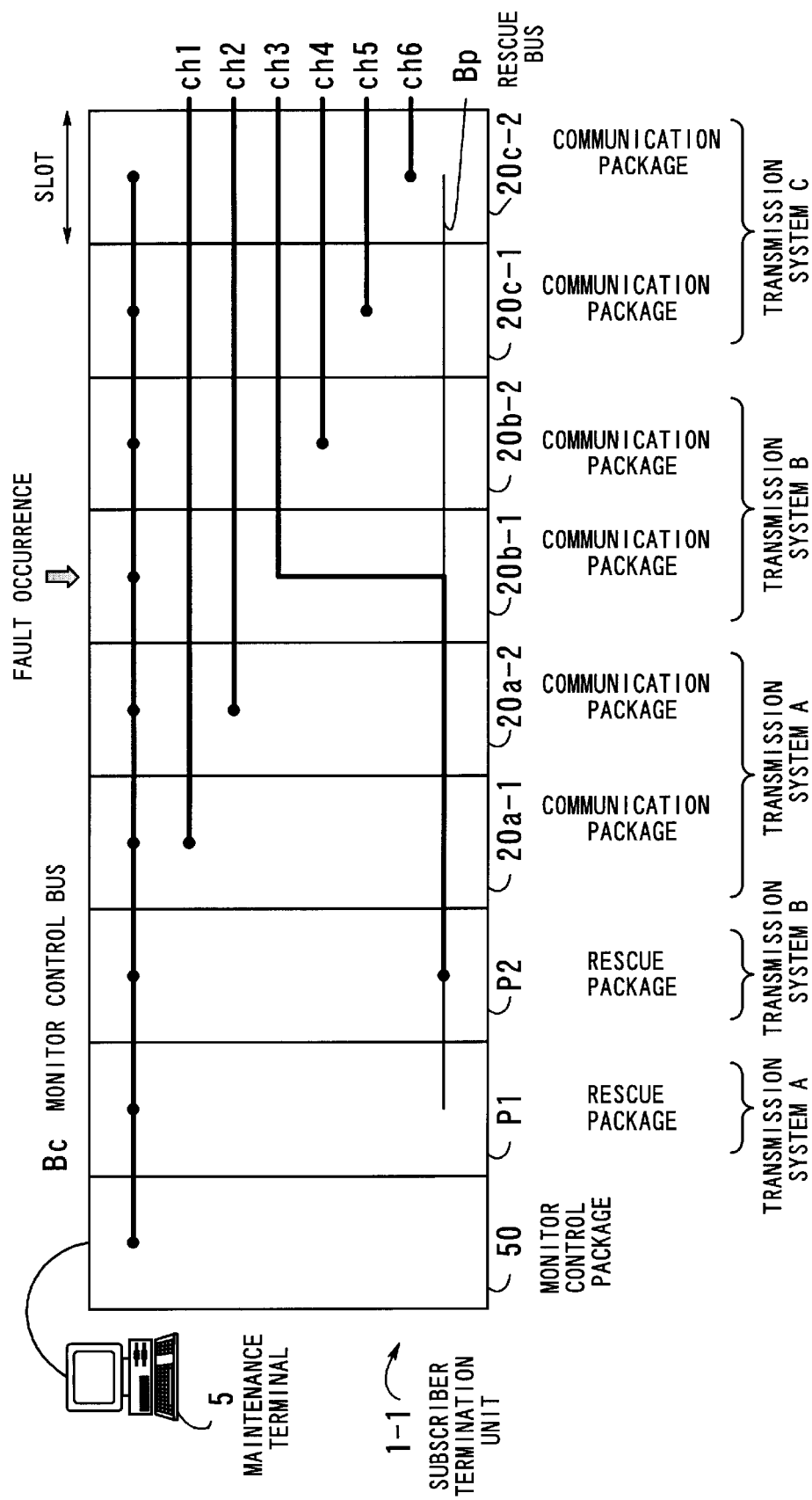
FIG. 4 is a diagram illustrating another operation of the subscriber termination unit shown in FIG. 2.

FIGS. 2 through 4 are diagrams of a subscriber termination unit in which a single rescue bus Bp is shared to recover a fault. A subscriber termination unit 1-1 shown in these figures has slots into which rescue packages P1 and P2 and communication packages 20a-1, 20a-2, 20b-1, 20b-2, 20c-1 and 20c-2 are inserted. Each of the rescue packages P1 and P2 corresponds to the aforementioned rescue unit of the present invention, and is generically called rescue packages P. The communication packages 20a-1, 20a-2, 20b-1, 20b-2, 20c-1 and 20c-2 correspond to the aforementioned communication units of the present invention, and are generically called communication packages 20. Each of the packages P1, P2, 20a-1, 20a-2, 20b-1, 20b-2, 20c-1 and 20c-2 is equipped with the switch part 10 made up of the line switch 11, the rescue bus connection switch 12 and the rescue switch 13.

The communication packages 20a-1 and 20a-2 and the rescue package P1 match a transmission system A, which may, for example, be POTS. The communication packages 20b-1 and 20b-2 and the rescue package P2 match a transmission system B, which may, for example, be ISDN. The communication packages 20c-1 and 20c-2 match a transmission system C, which may, for example, be xDSL.

A monitor control bus Bc connects the monitor control device 50 (hereinafter referred to as monitor control package 50), the rescue packages P and the communication packages 20 in multiple formation. The monitor control package 50 monitors, via the monitor control bus Bc, the communication packages 20 to detect occurrence of a fault, and sends instructions to perform switch control for rescue to the communication packages 20. A maintenance terminal 5 is connected to the monitor control package 50, and notifies the operator of the operational state of the subscriber termination unit 1-1.

Lines of channels ch1 through ch6 are respectively connected to the communication packages 20, as shown in FIG. 2. It is to be noted that only one channel is assigned to a single package for the sake of simplicity. However, in practice, a plurality of channels are assigned to a single package. For example, the communication package 20a-1 may be assigned channels ch1-1 through ch1-n, and the communication package 20b-1 may be assigned channels ch3-1 through ch3-n.

Further, the rescue bus Bp connects the monitor control package 50, the rescue packages P and the communication packages 20 in multiple formation.

Referring to FIG. 3, if a fault occurs in the communication package 20a-1, switch control that will be described later is carried out so that the channel ch1 subjected to signal processing in the communication package 20a-1 is connected to the rescue package P1 via the rescue bus Bp and is then processed therein. State information concerning fault occurrence is displayed at the maintenance terminal 5 via the monitor control package 50.

Similarly, as shown in FIG. 4, if a fault occurs in the communication package 20b-1, switch control that will be described later is carried out so that the channel ch3 subjected to signal processing in the communication package 20b-1 is connected to the rescue package P2 via the rescue bus Bp and is then processed therein. State information concerning fault occurrence is displayed at the maintenance terminal 5 via the monitor control package 50.

It is assumed that the communication package 20c-1 of the transmission system C that handles the channel ch5 fails to operate properly in the state shown in FIG. 2. At this time, the maintenance terminal 5 notifies the operator that a fault has occurred in the communication package 20c-1. Thus, the operator substitutes a rescue package that matches the transmission system C for either the rescue package P1 or P2. The newly inserted rescue package is connected to the channel ch5 via the rescue bus Bp, so that the fault that has occurred in the communication package 20c-1 can be recovered.

Figure 5:
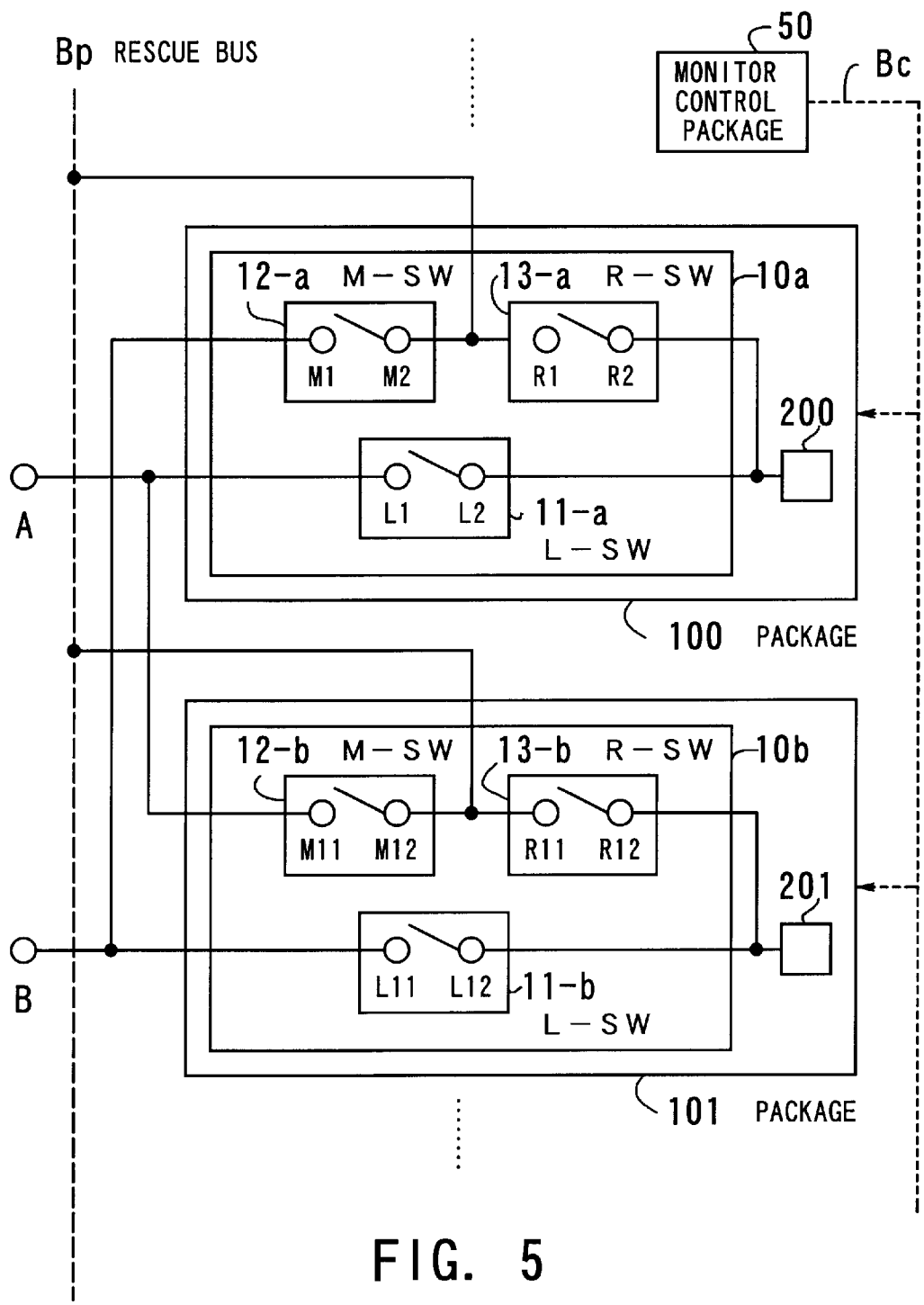
FIG. 5 is a block diagram of connections in the periphery of a rescue bus and switch parts.

A detailed description will be given of a structure and operation of the subscriber termination unit 1-1. FIG. 5 illustrates connections in the periphery of the rescue bus Bp and switch parts. The subscriber termination unit 1-1 has a configuration in which two packages form a single connection unit. Hereinafter, the line switches 11 are called L-SW11 (L means "line"), the rescue bus connection switches 12 are called M-SW12 (M means "multi"), and the rescue switches 13 are called R-SW13 (R means "rescue").

A package 100 shown in FIG. 5 includes a switch part 10a, and a signal processing part 200 (which corresponds to a signal processing unit when the package 100 is a communication package and to a backup signal processing part when the package 100 is a rescue package). The switch part 10a is made up of an L-SW11-a, M-SW12-a and R-SW13-a.

A package 101 includes a switch part 10b, and a signal processing part 201 (which corresponds to a signal processing unit when the package 101 is a communication package and to a backup signal processing part when the package 101 is a rescue package). The switch part 10b is made up of an L-SW11-b, M-SW12-b and R-SW13-b. The monitor control package 50 is connected to the packages 100 and 101 via the monitor control bus Bc.

The above structural parts are connected as follows. A terminal L1 of the L-SW11-a is connected to a point A and a terminal M11 of the M-SW12-b. When the package 100 is a communication package, the point A corresponds to, for example, a modem. When the package 100 is a rescue package, the point A is open. A terminal L2 of the L-SW11-a is connected to a terminal R2 of the R-SW13-a.

A terminal M1 of the M-SW12-a is connected to a terminal B and a terminal L11 of the L-SW11-b. When the package 101 is a communication package, the point B corresponds to, for example, a modem. When the package 101 is a rescue package, the point B is open. A terminal M2 of the M-SW12-a is connected to a terminal R1 of the R-SW13-a and the rescue bus Bp.

A terminal L12 of the L-SW11-b is connected to the signal processing part 201 and a terminal R12 of the R-SW13-b. A terminal M12 of the M-SW12-b is connected to a terminal R11 of the R-SW13-b and the rescue bus Bp.

Figure 6:
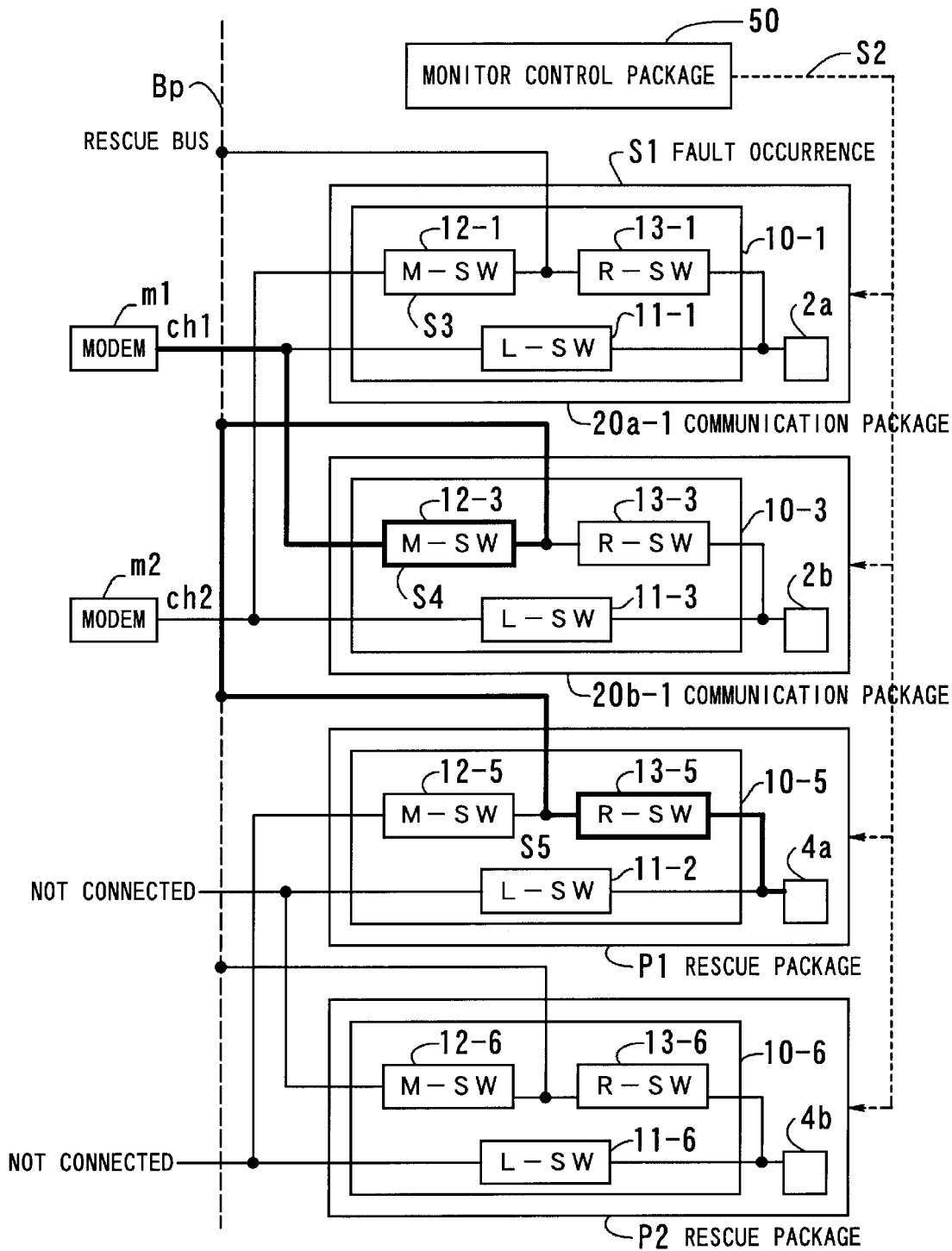
FIG. 6 is a block diagram of a switch control.

FIG. 6 illustrates a switch control. Initially, in normal operation, the M-SW12 and R-SW13 of all the packages are OFF, and the L-SW11 thereof are ON.

[S1] A fault occurs in the communication package 20a-1 of the transmission system A.

[S2] The monitor control package 50 recognizes occurrence of the fault and performs switch control including steps S3 through S5 described below.

[S3] The monitor control package 50 turns OFF the L-SW11-1, so that the communication package 20a-1 is disconnected from the modem m1.

[S4] The monitor control package 50 turns ON the M-SW12-3 so that the modem m1 is connected to the rescue bus Bp.

[S5] The monitor control package 50 turns ON the R-SW13-5 in order to make a connection between the modem m1 connected to the rescue bus Bp and the backup signal processing part 4a, so that the communication package 20a1 can be rescued by the rescue package P1.

As described above, in the subscriber termination unit 1-1 to which the present invention is applied, the switch control is performed while the single rescue bus Bp is shared. Thus, it is possible to rescue any of the communication packages 20 in which a fault has occurred by means of the rescue package P that has the corresponding transmission system.

Therefore, it is possible to flexibly recover a fault that occurs in any of the communication packages that have the different transmission systems. This makes it possible to solve the problem of inefficiency in the aforementioned simple doubled redundant configuration and fixed N:1 rescue control.

A description will be given of another embodiment of the present invention, which employs a plurality of rescue buses Bp so that an unused rescue bus Bp is selected from among these rescue buses Bp in order to rescue the system from a fault.

Figure 7:
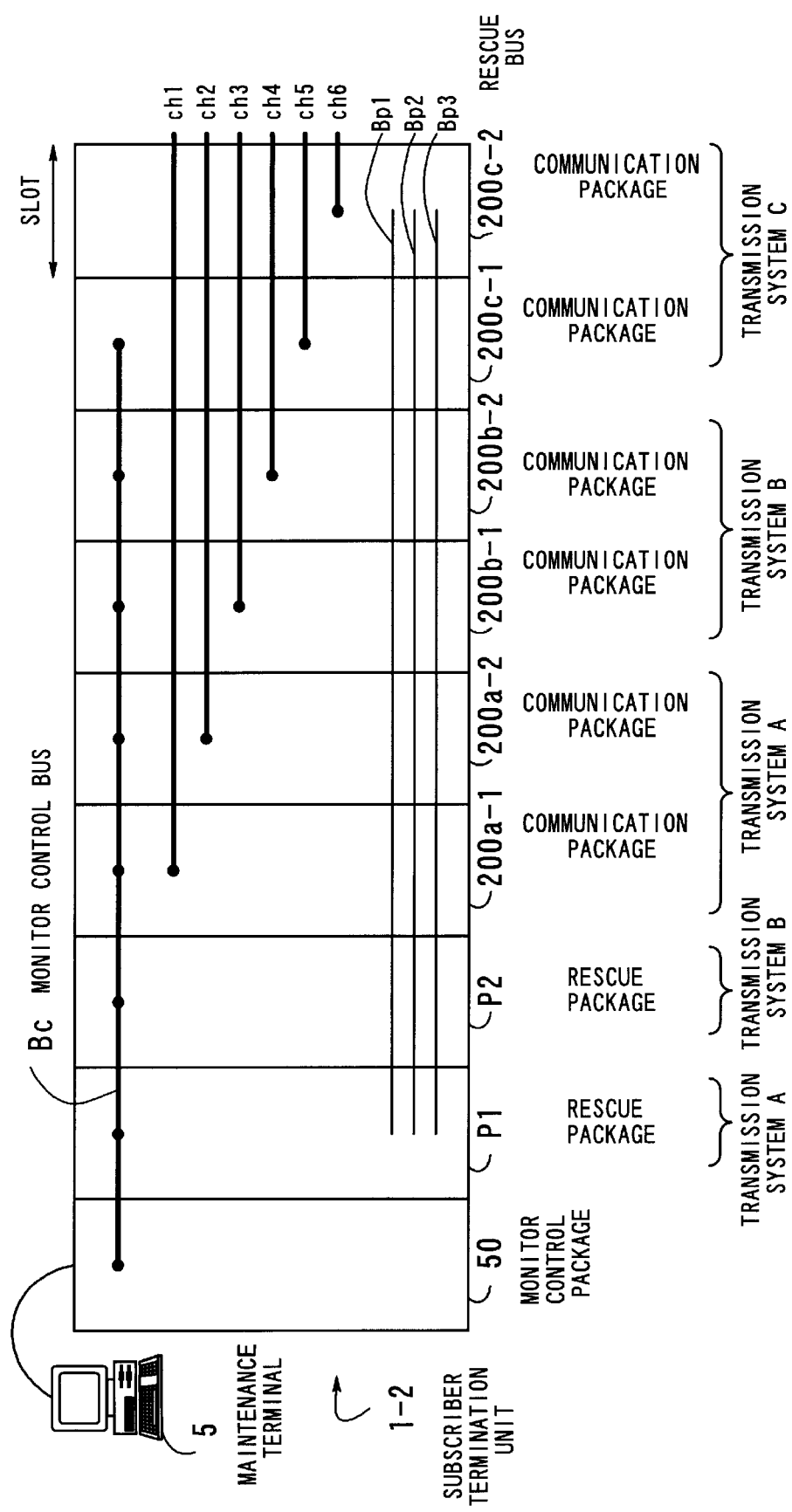
FIG. 7 is a diagram of a subscriber termination unit in which a fault is recovered by three rescue buses.
Figure 8:
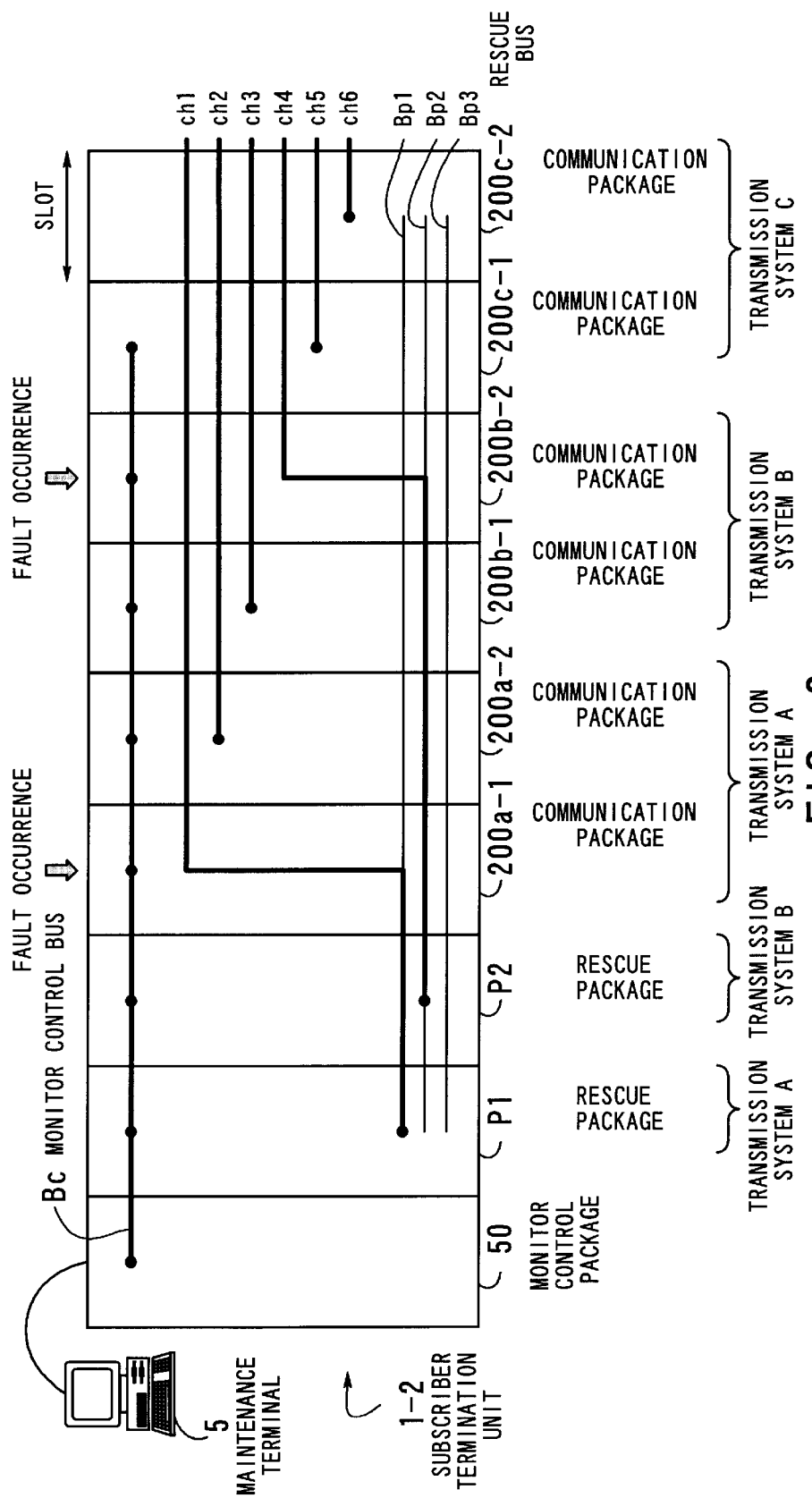
FIG. 8 is a diagram illustrating an operation of the subscriber termination unit shown in FIG. 7.

FIGS. 7 and 8 illustrate a subscriber termination unit that has the function of recovering a fault by a rescue bus selecting control described below. The configuration of a subscriber termination unit 1-2 shown in FIG. 7 is basically the same as that of the subscriber termination unit 1-1 shown in FIG. 2. The subscriber termination unit 1-2 differs from the subscriber termination unit 1-1 in that the unit 1-2 has three rescue buses Bp1 through Bp3 and the switch parts of the packages are newly equipped with rescue bus selecting switches (which will be described later with reference to FIGS. 9 and 10).

Taking into account the above, the reference numerals are changed so that communication packages 200a-1 and 200a-2 match the transmission system A, communication packages 200b-1 and 200b-2 match the transmission system B, and communication packages 200c-1 and 200c-2 match the transmission system C.

Referring to FIG. 8, if faults occur in the communication package 200a-1 (transmission system A) and the communication package 200b-2 (transmission system B), switch control that will be described later in detail is performed so that channel ch1 used for signal processing in the communication package 200a-1 is connected to the rescue package P1 (transmission system A) via the rescue bus Bp1, and is rescued by the rescue package P1.

Similarly, channel ch4 used for signal processing in the communication package 200b-2 is connected to the rescue package P2 (transmission system B) via the rescue bus Bp2, and is rescued by the rescue package P2. The state information related to the occurrence of faults to recovery is displayed at the maintenance terminal 5 through the monitor control package 50.

In the state shown in FIG. 7, it is assumed that the communication package 200c-1 of the transmission system C that processes channel ch5 has failed to operate properly. At that time, the maintenance terminal 5 notifies the operator of the occurrence of the fault in the communication package 200c-1. The operator removes the rescue package P1 or P2 and instead inserts a rescue package that matches the transmission system C into the corresponding slot. Then, an unused rescue bus is selected so that the newly inserted rescue package can be connected to the channel ch5. In this manner, the subscriber termination unit 1-2 can be rescued from the multiple faults.

It is also assumed that faults have occurred in the communication packages 200a-1 and 200a-2 of the transmission system A that process the channels ch1 and ch2, respectively in the state shown in FIG. 7. At that time, the maintenance terminal 5 notifies the operator of the occurrence of the faults in the communication packages 200a-1 and 200a-2.

The operator remove the rescue package P2 and instead inserts a rescue package that matches the transmission system A into the corresponding slot. Then, an unused rescue bus is selected so that the rescue package P1 and the newly inserted rescue package can be respectively connected to the channels ch1 and ch2. In this manner, the subscriber termination unit 1-2 can be rescued from the multiple faults.

Figure 9:
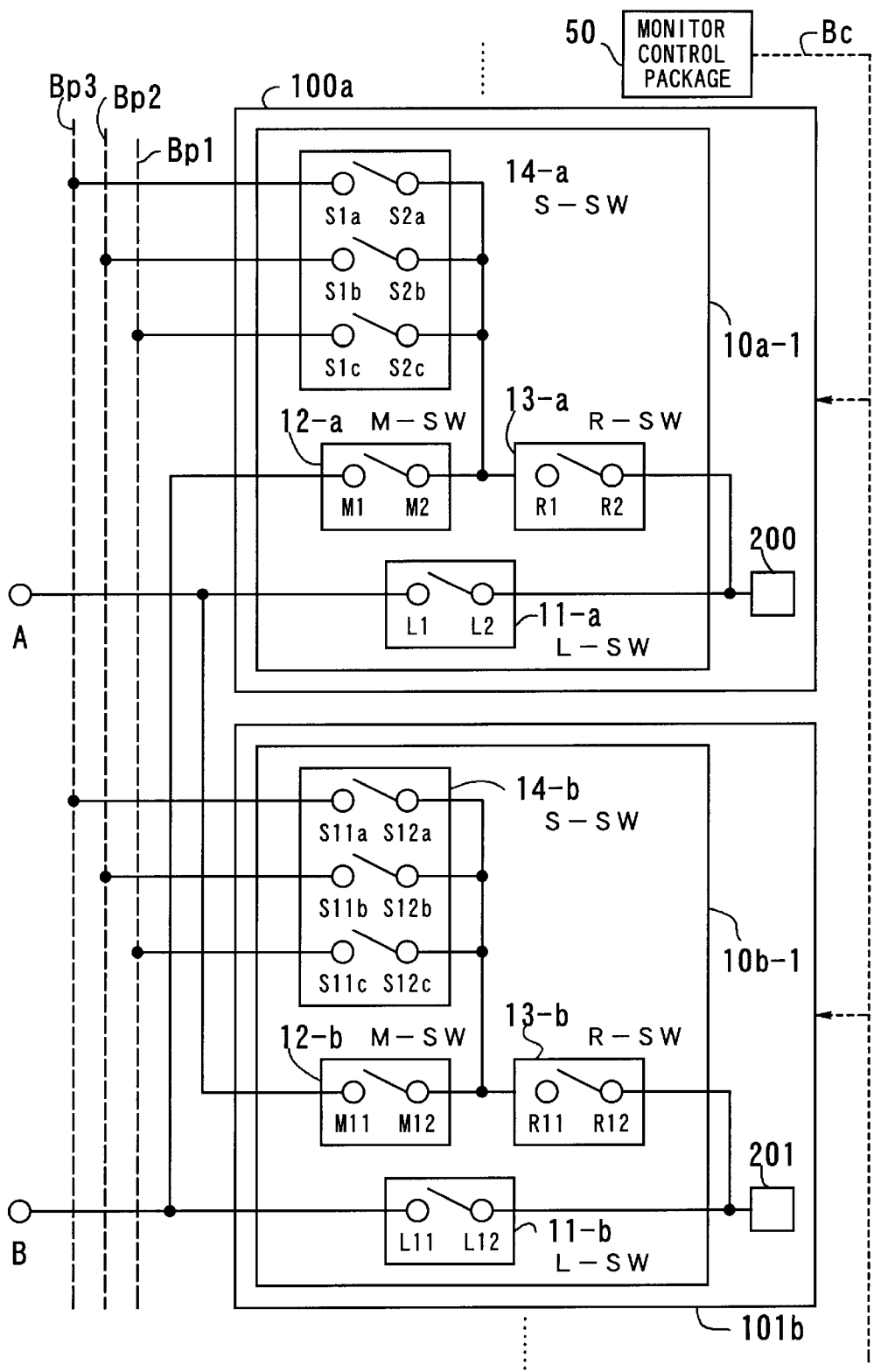
FIG. 9 is a block diagram of connections in the periphery of rescue buses and switch parts.

A detailed description will now be given of the configuration and operation of the subscriber termination unit 1-2. FIG. 9 illustrates connections of the rescue buses and components located in the periphery of the rescue buses. The subscriber termination unit 1-2 has a configuration in which two packages form a single connection unit. The switch parts are newly equipped with rescue bus selecting switches 14, which will be hereinafter called S-SW14 (S means "select").

A package 100a includes a switch part 10a-1 and the signal processing part 200 (which corresponds to a signal processing unit when the package 100a is a communication package and to a backup signal processing part when the package 100a is a rescue package). The switch part 10a-1 is made up of L-SW11-a, M-SW12-a, R-SW13-a and S-SW14-a.

A package 101b includes a switch part 10b-1 and the signal processing part 201 (which corresponds to a signal processing unit when the package 101b is a communication package and to a backup signal processing part when the package 101b is a rescue package). The switch part 10b-1 is made up of L-SW11-b, M-SW12-b, R-SW13-b and S-SW14-b. The monitor control package 50 is connected to the packages 10a and 101b via the monitor control bus Bc.

The above structural parts are connected as follows. The terminal L1 of the S-SW11-a is connected to the point A and the terminal M11 of the M-SW12-b. When the package 100a is a communication package, the point A corresponds to, for example, a modem. When the package 100a is a rescue package, the point A is open. The terminal L2 of the L-SW11-a is connected to the signal processing part 200 and the terminal R2 of the R-SW13-a.

The terminal M1 of the M-SW12-a is connected to the terminal B and the terminal L11 of the L-SW11-b. When the package 101b is a communication package, the point B corresponds to, for example, a modem. When the package 101b is a rescue package, the point B is open. The terminal M2 of the M-SW12-a is connected to the terminal R1 of the R-SW13-a, and terminals S2a, S2b and S2c of the S-SW14-a. Terminals of S1a, S1b and S1c of the S-SW14-a are connected to rescue buses Bp3, Bp2 and Bp1, respectively.

The terminal L12 of the L-SW11-b is connected to the signal processing part 201 and the terminal R12 of the R-SW13-b. The terminal M12 of the M-SW12-b is connected to the terminal R11 of the R-SW13-b, and terminals S12a, S12b and S12c of the S-SW14-b. Terminals S11a, S11b and S11c of the S-SW14-b are connected to the rescue buses Bp3, Bp2 and Bp1, respectively.

Figure 10:
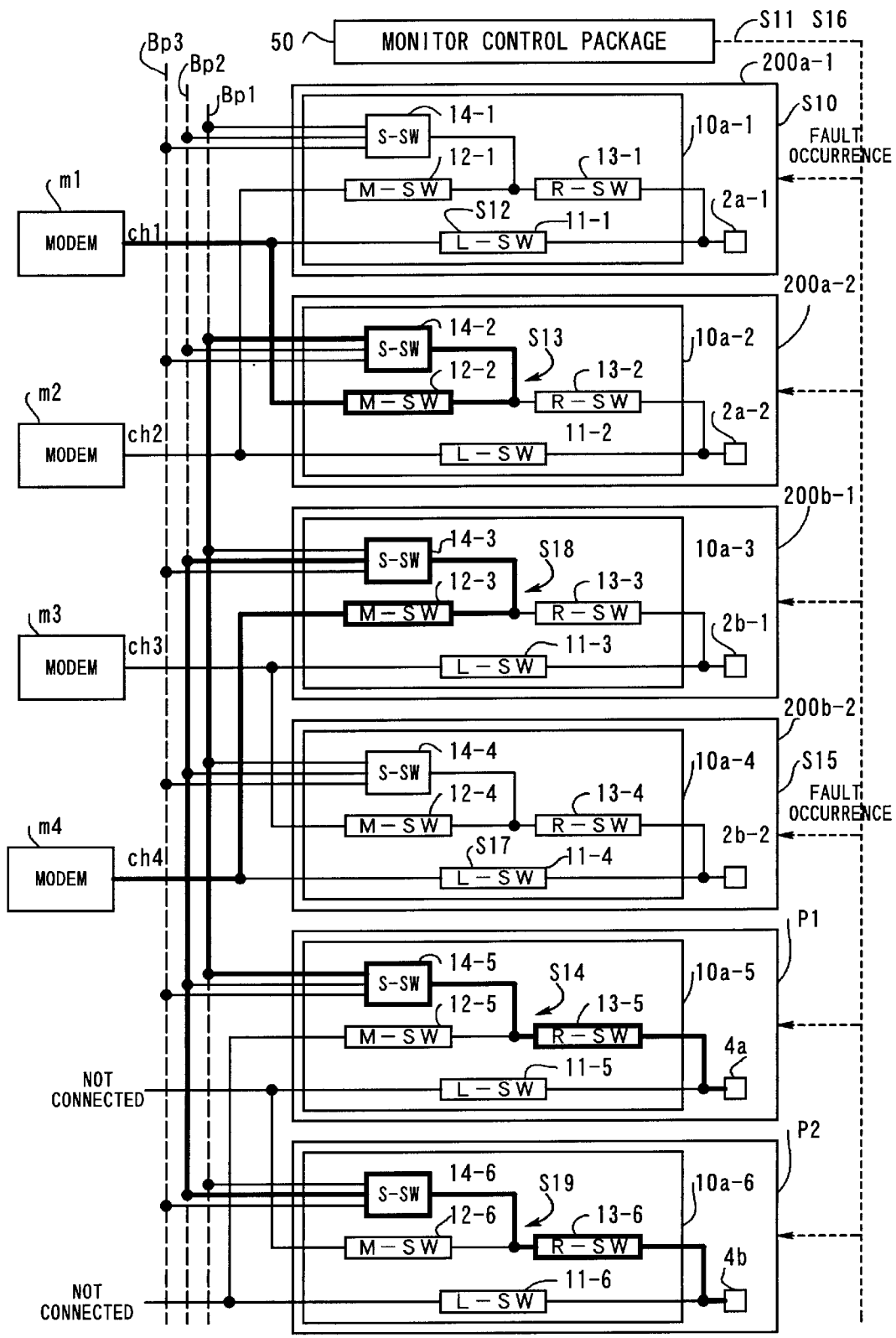
FIG. 10 is a block diagram of a switch control.

FIG. 10 is a diagram illustrating a switch control. Initially, in normal operation, the M-SW12, R-SW13 and S-SW14 of all the packages are OFF, and the L-SW11 thereof are ON.

[S10] A fault occurs in the communication package 200a-1 of the transmission system A.

[S11] The monitor control package 50 recognizes occurrence of the fault and performs switch control including steps S12 through S14 described below.

[S12] The monitor control package 50 turns OFF the L-SW11-1 so that the communication package 200a-1 is disconnected from the modem m1.

[S13] The monitor control package 50 detects the rescue bus Bp1 as an unused bus (any of the unused rescue buses can be used). Then, the monitor control package 50 turns ON the M-SW12-2 and connects the S-SW14-2 to the rescue bus Bp1, so that the modem m1 can be connected to the rescue bus Bp1.

[S14] The monitor control package 50 turns ON the R-SW13-5 and then connects the S-SW14-5 to the rescue bus Bp1, so that the modem m1 can be rescued by the rescue package P1.

[S15] A fault occurs in the communication package 200b-2 of the transmission system B.

[S16] The monitor control package 50 recognizes the fault and performs switch control including steps S17 through S19.

[S17] The monitor control package 50 turns OFF the L-SW11-4 so that the communication package 200b-2 is disconnected from the modem m4.

[S18] The monitor control package 50 detects the rescue bus Bp2 as an unused rescue bus (any of the unused rescue buses can be used). Then, the monitor control package 50 turns ON the M-SW12-3 and then connects the S-SW14-3 to the rescue bus Bp2, so that the modem m4 can be connected to the rescue bus Bp2.

[S19] The monitor control package 50 turns ON the R-SW13-6, and then connects the S-SW14-6 to the rescue bus Bp2, so that the modem m4 can be rescued by the rescue package P2.

As described above, in the subscriber termination unit 1-2 to which the present invention is applied, an unused rescue bus is selected from among the rescue buses Bp1 through Bp3, and the switch control is performed. Thus, the communication packages 20 in which faults have simultaneously occurred can be recovered by the rescue packages of the corresponding transmission systems.

Therefore, it is possible to flexibly recover a fault that occurs in the communication packages that have the different transmission systems. This makes it possible to solve the problem of inefficiency in the aforementioned simple doubled redundant configuration and fixed N:1 rescue control.

A description will be given of the complete rescue and the provisional rescue. Referring to FIG. 2, for example, the complete rescue can be defined so that, in case where a fault has occurred in the communication package 20a-1 of the transmission system A, all the channels (ch1-1 through ch1-n) on the communication package 20a-1 are rescued by the rescue package P1 of the transmission system A. The above complete rescue makes it possible to completely place the communication package 20a-1 out of service and replace it by a new one.

The complete rescue can also be defined by referring to FIG. 7 as follows. In case where faults have occurred in the communication package 200a-1 of the transmission system A and the communication package 200b-2 of the transmission system B, all the channels (ch1-1 through ch1-n) on the communication package 200a-1 are rescued by the rescue package P1 of the transmission system A, and all the channels (ch3-1 through ch3-n) on the communication package 200b-1 are rescued by the rescue package P2 of the transmission system B. The above complete rescue makes it possible to completely place the communication packages 200a-1 and 200b-1 out of service and replace them by new ones. It will be noted that communication packages equal in number to the rescue buses can be rescued at maximum. The configuration shown in FIG. 7 employs the three rescue buses, so that up to three communication packages can be simultaneously rescued.

Referring to FIG. 2, for example, the provisional rescue can be defined so that, in case where a fault has occurred in, for example, the channel ch1-1 out of the channels ch1-1 through ch1-*n* of the communication package 20*a*-1 of the transmission system A, only the channel ch1-1 is rescued by the rescue package P1. In addition, if another fault has occurred in, for example, the channel ch2-1 out of the channels ch2-1 through ch2-*n* of the communication package 20*a*-2 of the transmission system A, only the channel ch2-1 is rescued by the rescue package P1.

In the above manner, the rescue package P1 simultaneously rescues channels over the communication channels 20*a*-1 and 20*a*-2. Thus, the communication packages 20*a*-1 and 20*a*-2 cannot be replaced by new ones unless the services provided to the subscribers that use channels other than the faulty channels are interrupted. A similar situation will occur in the provisional rescue for the subscriber termination unit having a plurality of rescue buses.

A description will now be given of a case where a process program of the same transmission system as that of the communication package in which a fault has occurred is downloaded on the unit basis or the channel basis so that the transmission system of the rescue package is rewritten to rescue the subscriber termination unit from the fault. In the rewriting of the transmission system of the rescue package, the contents of the process performed by the backup signal processing part are changed to those of the process that matches the corresponding transmission system. If a fault has occurred in the communication package 20, the maintenance terminal 5 is notified of the involved communication package and its transmission system via the monitor control package 50.

Figure 11:
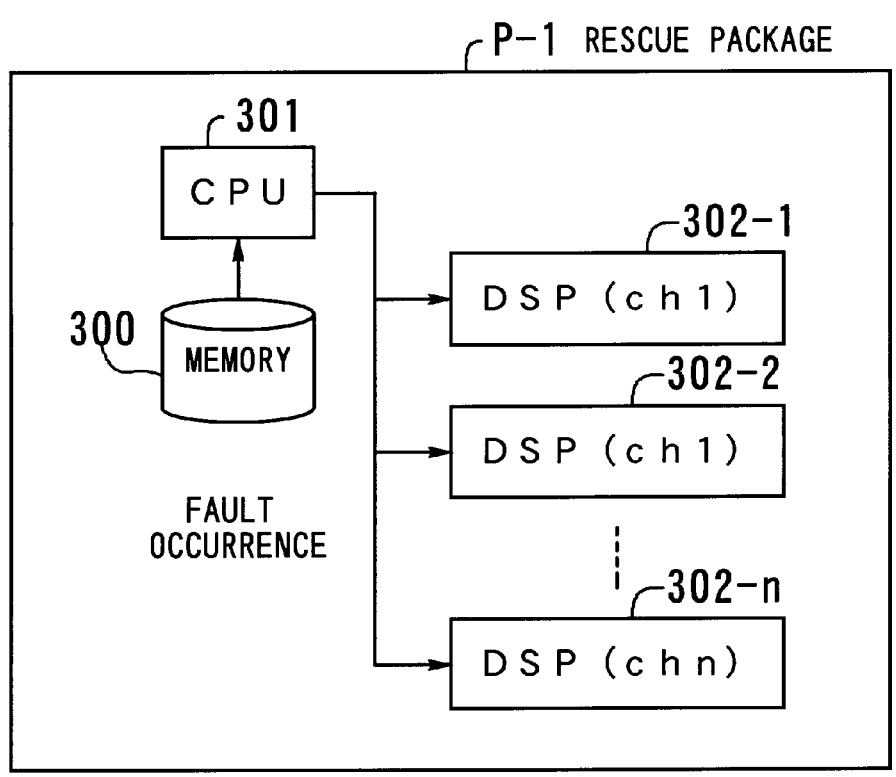
FIG. 11 is a block diagram of a first example of downloading a process program.
Figure 12:
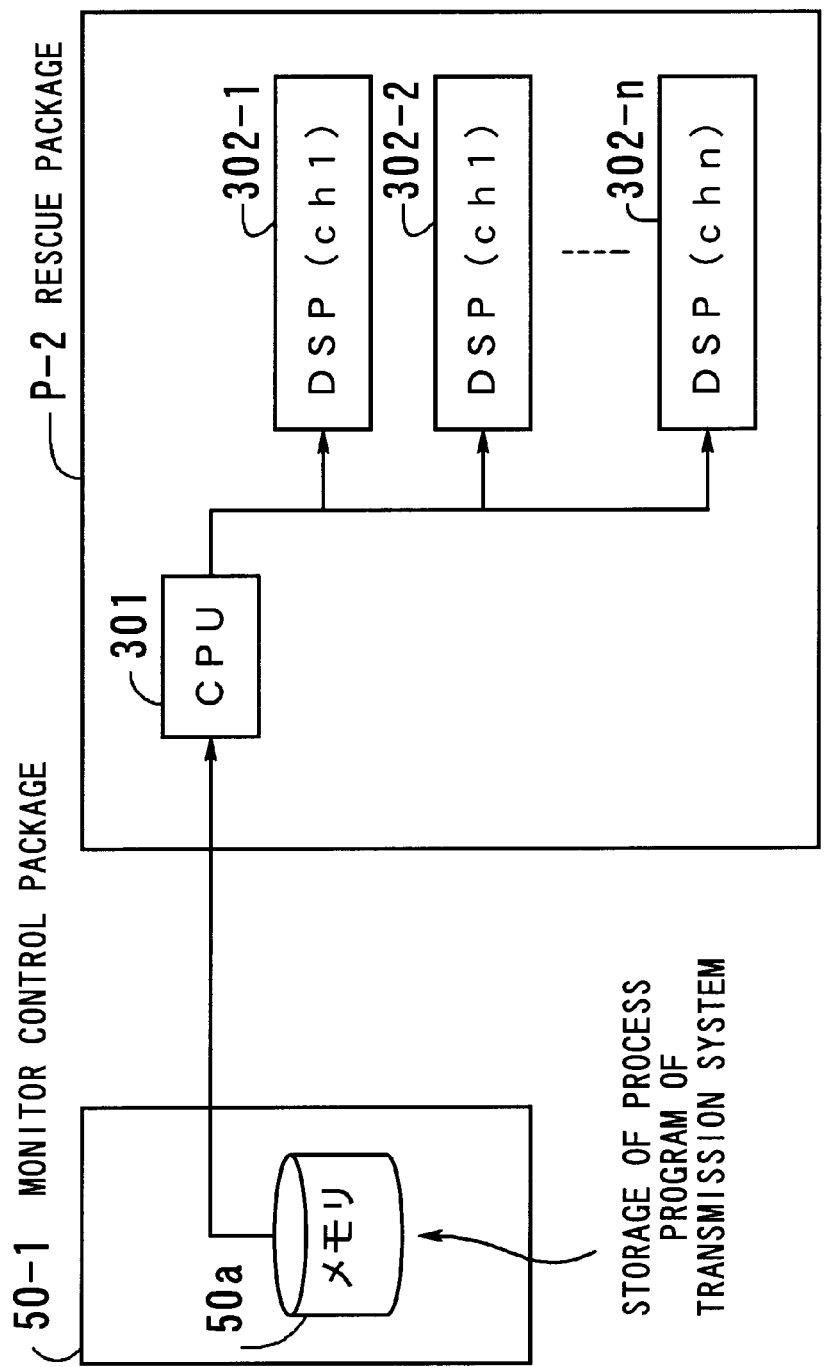
FIG. 12 is a block diagram of a second example of downloading a process program.
Figure 13:
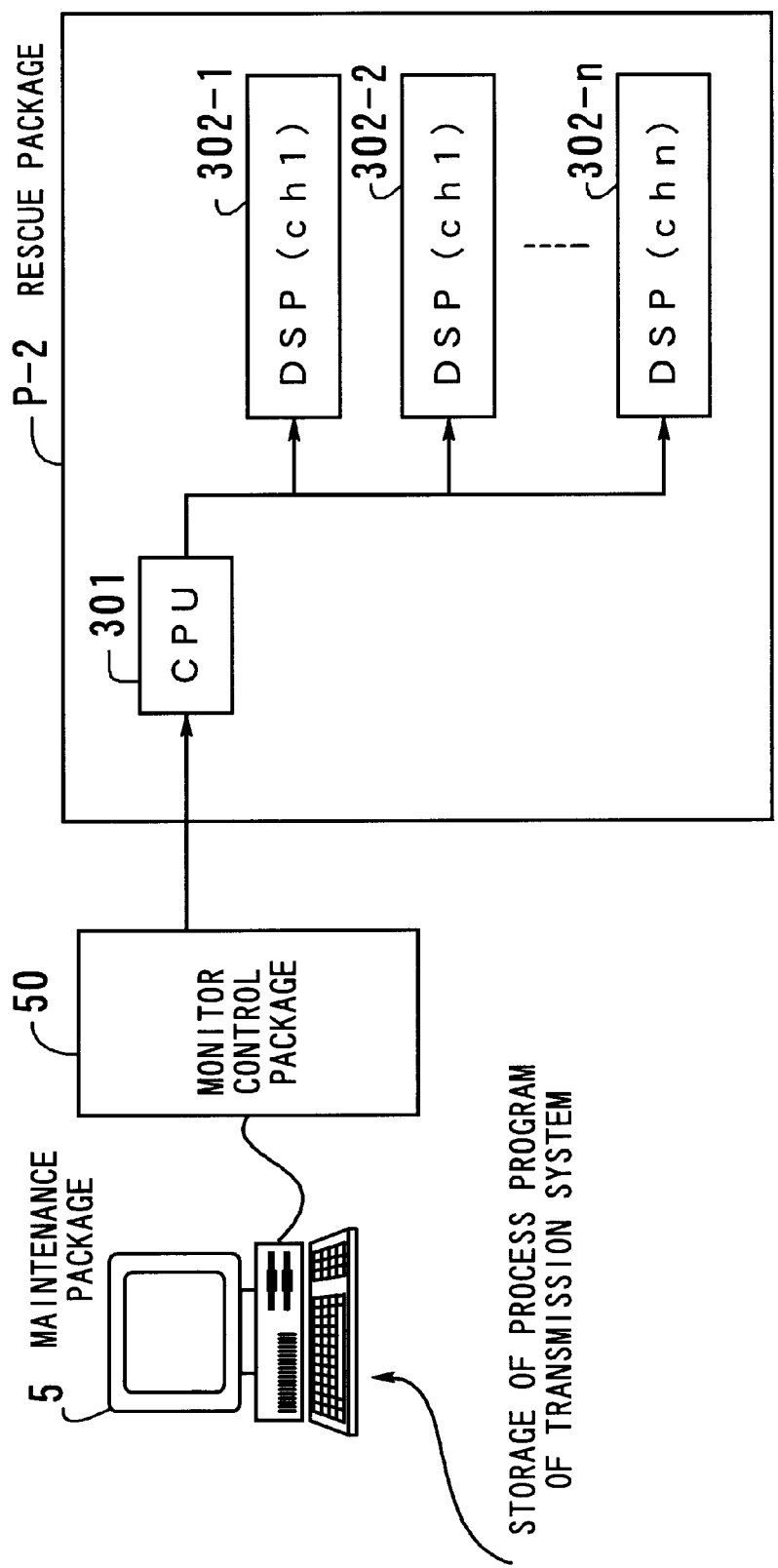
FIG. 13 is a block diagram of a third example of downloading a process program.

FIGS. 11 through 13 illustrate ways to download a process program. FIG. 11 shows a configuration in which a storage medium (memory 300) for storing a process program is provided in a rescue package P-1. The process program is downloaded to DSPs (Digital Signal Processors) 302-1 through 302-*n* of channels ch1-ch*n* in the rescue package P-1 under the control of a CPU 301. The program is downloaded within the rescue package P-1, so that switching of program can be completed promptly.

FIG. 12 illustrates a configuration in which a storage medium (memory 50*a*) for storing a process program is provided in a monitor control package 50-1. The program is downloaded to DSPs 302-1 through 302-*n* of channels via the CPU 301 of a rescue package P-2. The configuration shown in FIG. 12 does not require each rescue package to have the respective storage medium for storing the program, so that the load on the circuitry can be reduced.

FIG. 13 illustrates a configuration in which the maintenance terminal 5 placed in a remote place has the process program. When a fault occurs, the process program is transferred to the rescue package P-2 via the monitor control package 50 and is then downloaded to the channels. The configuration shown in FIG. 13 does not require the subscriber termination unit to have the storage medium for storing the process program, and easily accomplishes a modification of the process program such as upgrading.

The rescue using downloading of the process program corresponding to the involved transmission system can be applied to not only the configuration using a single rescue bus but also the configuration using a plurality of rescue buses. Further, the complete rescue and the provisional rescue can be applied to the downloading-based rescue. The basic operations in these applications are almost the same as those that have been described, and a description thereof is omitted here.

Next, a description will be given of a rescue control in which the complete rescue and the provisional rescue coexist. A system is considered which has a plurality of rescue buses and at least two rescue packages in which the transmission systems can be changed by downloading the process program.

In the above system, one of the rescue packages is used for the complete rescue, and another rescue package is used for the channel-based rescue. Thus, the system can be rescued efficiently. For example, in a case where a rescue package provisionally rescues a plurality of channels simultaneously, a faulty package having defective channels of the same transmission system as that of the faulty channels in the provisional rescue is completely rescued by another rescue package. The above faulty package is replaced by a new one, so that the number of faulty channels that are provisionally rescued can be reduced. Therefore, it is possible to simultaneously rescue faulty packages of different transmission systems efficiently without interrupting services for the subscribers on the faulty package that are not affected by the fault.

As described above, the communication control system 1 of the present invention has switch means for completely or provisionally rescuing a communication unit in which a fault has occurred by using one or a plurality of rescue buses for recovering the fault.

With the above structure, the communication unit which fails to operate properly can be recovered efficiently and economically. It is also possible to flexibly recover a fault by downloading the process programs that match the transmission systems of the communication units to a rescue unit or units.

The above description is directed to the subscriber termination unit that uses metallic wires as an embodiment of the communication control system 1 of the present invention. The present invention can widely be applied, as means for rescuing a unit or system, to other communication systems such as optical access systems.

In short, the communication control system of the present invention completely or provisionally rescues a communication unit in which a fault has occurred by switch means that includes a line switch, a rescue bus connection switch and a rescue switch, and rescues the above communication unit by using a rescue bus provided for rescuing a unit in which a fault has occurred. Therefore, it is possible to efficiently and economically rescue a communication unit from a fault.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication control system having a rescue architecture comprising:

a rescue bus connected to units in a multiple formation;

switch parts each including a line switch, a rescue bus connecting switch and a rescue switch, the line switch connecting a signal in a channel on a line and a signal processing part that processes the signal in normal operation and disconnecting the signal from the signal processing part when a fault has occurred, the rescue bus connecting switch connecting the line and the rescue bus when the fault has occurred, the rescue switch connecting the rescue bus and a backup signal processing part that processes the signal instead of a faulty unit that is one of the units in which the fault has occurred;

at least one communication unit including one of said switch parts and said signal processing part;

a rescue unit including another one of said switch parts and said backup signal processing part and performing at least one of a complete rescue based on a unit basis and a provisional rescue based on a channel basis; and a monitor control device monitoring occurrence of a fault and perform switch control of the switch parts.

2. The communication control system according to claim 1, wherein said rescue unit performs rescue that matches a transmission formation of the faulty unit.

3. The communication control system according to claim 2, wherein the rescue bus is a single rescue bus that is shared by communication units.

4. The communication control system according to claim 3, wherein the faulty unit is rescued by the rescue unit, so that the faulty unit can be disconnected and replaced.

5. The communication control system according to claim 3, wherein a faulty channel among channels of said at least one communication unit is rescued by the rescue unit so that normal channels continue to work and only the faulty channel is switched to a channel of the rescue unit.

6. The communication control system according to claim 2, further comprising a rescue bus selecting switch that selects an unused bus from among a plurality of rescue buses, the rescue unit being substituted for the faulty unit via the unused bus.

7. The communication control system according to claim 6, further comprising a plurality of rescue units equal in number to the plurality of rescue buses, so that the complete rescue can be performed, while faulty units equal in number to transmission systems of the plurality of rescue units can be disconnected and replaced.

8. The communication control system according to claim 6, wherein only a faulty channel is replaced by a channel of the rescue unit, while normal channels continue to work.

9. The communication control system as claimed in claim 1, wherein the rescue unit downloads, on a unit or channel basis, a process program having the same transmission system as that of the faulty unit from at least one of a memory in the rescue unit, said monitor control device and a maintenance terminal.

10. The communication control system as claimed in claim 9, wherein the rescue bus is a single rescue bus that is shared by communication units.

11. The communication control system as claimed in claim 10, wherein the process program that matches the transmission system of the faulty unit is downloaded to the rescue unit on the unit basis, so that the complete rescue can be performed, while the faulty unit can be disconnected and replaced.

12. The communication control system as claimed in claim 10, wherein the provisional rescue is performed so that a faulty channel is replaced by the rescue unit to which the process program that matches the transmission system of the faulty channel is downloaded on the channel basis, while normal channels continue to work.

13. The communication control system as claimed in claim 9, further comprising a rescue bus selecting switch that selects an unused bus from among a plurality of rescue buses, the rescue unit being substituted for the faulty unit via the unused bus.

14. The communication control system as claimed in claim 13, wherein the process program that matches the transmission system of the faulty unit is downloaded to the rescue unit on the unit basis, so that the complete rescue can be performed, while the faulty unit can be disconnected and replaced.

15. The communication control system as claimed in claim 13, wherein the provisional rescue is performed so that a faulty channel is replaced by the rescue unit to which the process program that matches the transmission system of the faulty channel is downloaded on the channel basis, while normal channels continue to work.

16. The communication control system as claimed in claim 13, wherein the rescue unit includes a first rescue unit that performs the complete rescue and a second rescue unit that performs the provisional rescue, so that rescue sequentially shifts from the provisional rescue to the complete rescue.

\* \* \* \* \*